UNITED STATES PATENT OFFICE.

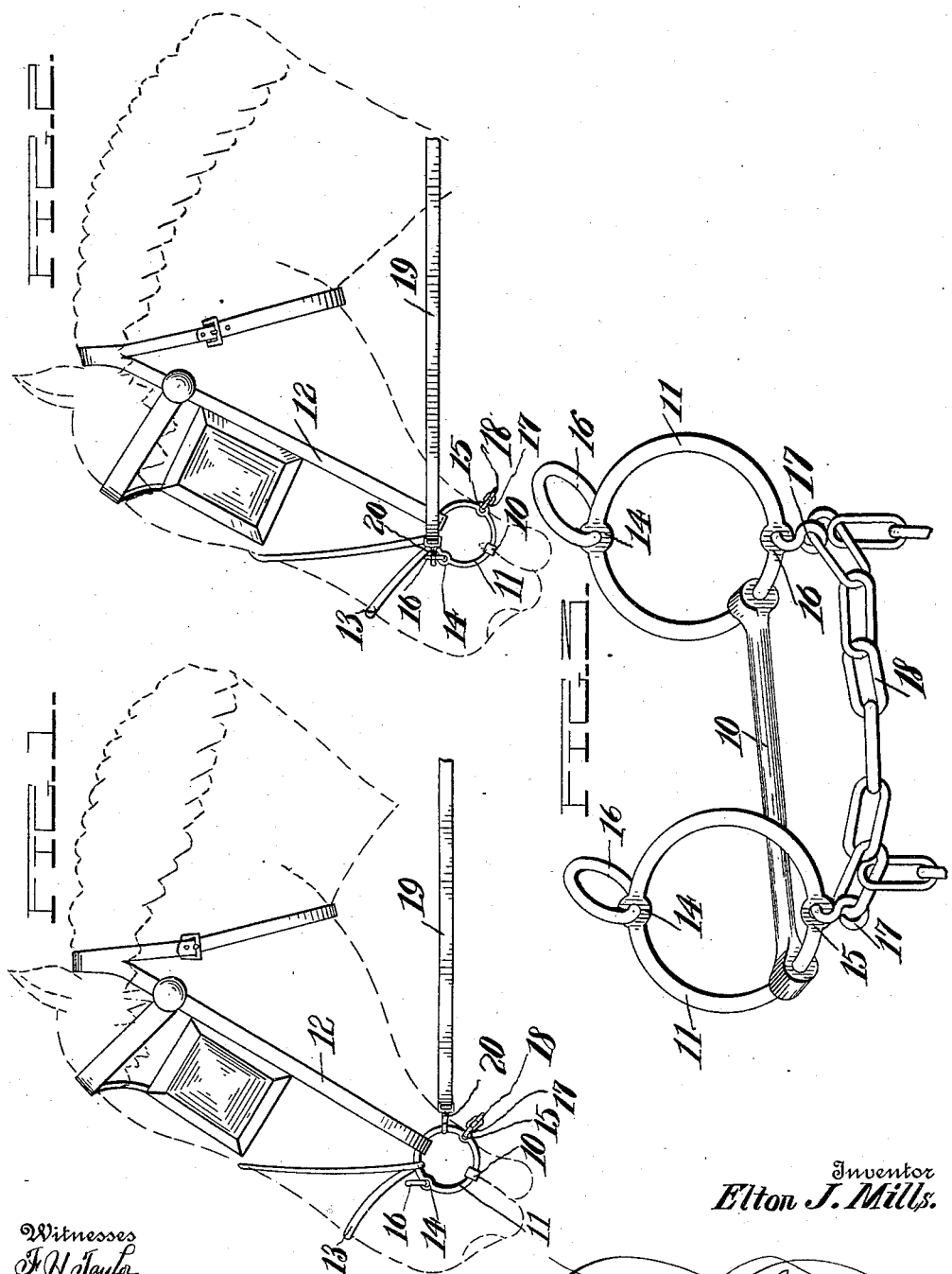

ELTON J. MILLS, OF LONG PINE, NEBRASKA.

DRIVING-BIT.

1,054,593.   Specification of Letters Patent.   Patented Feb. 25, 1913.

Application filed May 31, 1910. Serial No. 564,281.

*To all whom it may concern:*

Be it known that I, ELTON J. MILLS, a citizen of the United States, residing at Long Pine, in the county of Brown, State of Nebraska, have invented certain new and useful Improvements in Driving-Bits; and I do hereby declare the following to be a full, clear, and exact description of the invention, such as will enable others skilled in the art to which it appertains to make and use the same.

This invention relates to improvements in driving bits, and has for one of its objects to provide a bit which is capable of being arranged for driving a horse under normal conditions, and which may be readily arranged for horses which require to be controlled and prevented from becoming unruly or unmanageable.

Another object of the invention is to provide a device of this character which may be readily adjusted to fit horses of varying sizes and to horses requiring a greater or lesser degree of severity of treatment and to enable them to be effectually controlled without injury to the horse and without danger to the driver.

Another object of the invention is to provide a device of this character which may be adjusted to operate as a "hard" or a "soft" bit, as required.

With these and other objects in view, the invention consists in certain novel features of construction as hereinafter shown and described and then specifically pointed out in the claim; and, in the drawings illustrative of the preferred embodiment of the invention, Figure 1 is a side elevation of the improved device applied as a "soft" bit, or when the horse is operating under normal conditions, Fig. 2 is a similar view showing the improved bit arranged as a "hard" bit, or one whereby an unruly horse may be controlled and restrained, Fig. 3 is an enlarged perspective view of the improved bit, detached.

The improved device comprises a bit bar 10 having relatively large rings 11 connected thereto at the ends, the rings occupying the same locality as the ordinary bit rings of the head stall, and to which the cheek straps 12 and the nose strap 13 of the harness are coupled in the usual manner. Each ring is provided at opposite sides with eyes 14—15, the eyes 14 being provided with loose rings 16, while the eyes 15 are provided with means such as cold-shut S-rings 17, to enable a jaw chain 18 to be connected thereto and extend between the bit rings. The chain will preferably be provided with a few surplus links so that it may be readily increased or decreased in length to correspond to the horse upon which the bit is to be employed. As will be readily understood because of the eye connection between the rings 11 and the rings 16 the plane of the former is substantially at right angles to the plane of the latter as will be readily seen by referring to Fig. 3 of the drawings.

When the horse is operating under normal conditions, or when the improved device is applied to a horse which is not liable to become unruly or attempt to run away the reins, one of which is represented at 19, are coupled as by snaps 20 directly to the rings 11, the loose rings 16 then lying in inoperative position and with the chain 18 extending beneath the jaw of the horse, and producing no effect upon the animal. If the improved device is to be applied to horses which require to be controlled or checked the snaps 20 of the reins are detached from the rings 11 and connected to the loose rings 16, as shown in Fig. 2. By this means a pull upon the reins 19 will cause the chain 18 to bear with considerable force against the jaw of the animal, and perfectly control and subdue it, while at the same time not producing any injury to the animal unless he continues his unruly conduct, in which event of course the driver is able to apply a suitable pressure to the jaw of the horse. The pressure may be increased by shortening the chain 18 and the "hardness" of the bit will be correspondingly increased. When the improved device is employed with the reins connected to the rings 16 the pressure upon the jaw of the horse will cease immediately when the horse ceases to pull forwardly against the reins, and a horse soon discovers this fact and rarely makes the second attempt to pull against the improved bit.

The improved bit is especially adapted for use in breaking colts or older horses which have never been broken to harness. It will be impossible for the horse to move his mouth sidewise upon the improved bit as the relatively large rings 11 effectually prevent this movement, consequently the horse cannot displace the bit. The improved bit is also admirably adapted for use when employing three horses in a team, as the improved bit cannot be drawn sidewise through the horses' mouths. The improved bit may be readily changed to form a "hard" or "soft" bit, as it is only necessary to change the snaps 20 from the larger rings 11 to the smaller rings 16. The presence of the smaller rings 16 does not prevent the larger rings 11 from slipping around within the bearings at the ends of the bar 10, as in the ordinary bit ring, consequently when the snaps 20 are connected to the larger rings the improved bit operates precisely the same as an ordinary bit, while at the same time it is in condition to be quickly transformed into a hard or curbing bit. The improved bit is also especially adapted for use by horse trainers and tamers, and may be employed without injury to the horse.

What is claimed is:—

A combination driving bit comprising a main bar, rings pivoted to the ends of the bar and extending thereabove, means for attaching curb lines to said rings, said attaching means being connected with said rings at points approximately ninety degrees from the main bar and forwardly thereof, attaching devices connected with the rings at points diametrically opposite from the first named attaching devices, and a chain engaged with the second named attaching devices, said rings being adapted for the attachment of lines thereto.

In testimony whereof, I affix my signature, in presence of two witnesses.

ELTON J. MILLS.

Witnesses:
J. S. DAVISSON,
I. N. MILLS.

Copies of this patent may be obtained for five cents each, by addressing the "Commissioner of Patents, Washington, D. C."